United States Patent
Devendran et al.

(10) Patent No.: US 10,400,887 B2
(45) Date of Patent: Sep. 3, 2019

(54) METHOD AND APPARATUS FOR CAPTURING KINETIC ENERGY WITHIN AN AUTOMATIC TRANSMISSION ACCUMULATOR

(71) Applicant: Ford Global Technologies, LLC, Dearborn, MI (US)

(72) Inventors: Ram Sudarsan Devendran, Farmington Hills, MI (US); John Edward Brevick, Livonia, MI (US); Steven Anatole Frait, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 15/494,668

(22) Filed: Apr. 24, 2017

(65) Prior Publication Data

US 2018/0306313 A1   Oct. 25, 2018

(51) Int. Cl.
| | |
|---|---|
| *F16H 61/00* | (2006.01) |
| *F16H 59/66* | (2006.01) |
| *F16H 59/44* | (2006.01) |
| *F16H 59/36* | (2006.01) |
| *F16H 59/68* | (2006.01) |

(52) U.S. Cl.
CPC ......... *F16H 61/0021* (2013.01); *F16H 59/44* (2013.01); *F16H 59/66* (2013.01); *F16H 59/68* (2013.01); *F16H 2059/366* (2013.01); *F16H 2059/663* (2013.01); *F16H 2059/683* (2013.01); *F16H 2061/0034* (2013.01)

(58) Field of Classification Search
CPC ....... F16H 2061/0034; F16H 2059/663; F16H 59/66; F16H 59/44
See application file for complete search history.

(56) References Cited

U.S. PATENT DOCUMENTS

| 7,147,078 B2 | 12/2006 | Teslak et al. |
|---|---|---|
| 8,968,135 B2 | 3/2015 | Stephens et al. |
| 10,233,949 B2 * | 3/2019 | Versteyhe ............... F15B 1/033 |
| 2014/0137545 A1 * | 5/2014 | Smith ................... E02F 9/2217 60/327 |
| 2016/0221448 A1 | 8/2016 | Pritchard |
| 2018/0345950 A1 * | 12/2018 | Devendran ......... B60W 10/196 |

FOREIGN PATENT DOCUMENTS

EP      3040226 A1    7/2016

* cited by examiner

*Primary Examiner* — Sherry L Estremsky
(74) *Attorney, Agent, or Firm* — David Kelley; Brooks Kushman, P.C.

(57) ABSTRACT

A vehicle is provided. The vehicle may include a controller. The controller may be configured to, responsive to the vehicle traveling at a constant speed for a predetermined time, hydraulically charge the accumulator, and responsive to a pressure of the accumulator exceeding a first threshold that is defined by a road grade, cease charging the accumulator, and satisfy transmission line pressure demand with the pressure to deplete the accumulator.

20 Claims, 6 Drawing Sheets

Fig-1

_Fig-2_

_Fig-3A_

METHOD AND APPARATUS FOR CAPTURING KINETIC ENERGY WITHIN AN AUTOMATIC TRANSMISSION ACCUMULATOR

TECHNICAL FIELD

The present disclosure relates to controlling a hydraulic circuit within an automatic transmission to capture kinetic energy.

BACKGROUND

Fuel economy and emissions performance of an automobile is an important characteristic. A higher fuel economy and lower emissions rating may make a vehicle more attractive to potential buyers and may help an automotive manufacturer meet fuel economy and emissions standards imposed by local governments. One method of reducing fuel consumption and decreasing vehicle emissions is capturing kinetic energy generated by a moving vehicle. Capturing kinetic energy dissipated when friction brakes are applied is well known. However, these methods often involve complex and expensive components. Kinetic energy may also be present and lost within an automatic transmission. Automatic transmissions may utilize pressurized hydraulic fluid to power the various hydraulic components within the transmission.

SUMMARY

According to one embodiment of this disclosure, a vehicle is provided. The vehicle may include a controller. The controller may be configured to responsive to the vehicle traveling at a constant speed for a predetermined time, hydraulically charge the accumulator, and responsive to a pressure of the accumulator exceeding a first threshold that is defined by a road grade, cease charging the accumulator, and satisfy transmission line pressure demand with the pressure to deplete the accumulator.

According another embodiment of disclosure, a method of operating a vehicle is provided. The method may include hydraulically charging an accumulator, responsive to the vehicle traveling at a constant speed for a predetermined time, ceasing the charge of the accumulator exceeding a first threshold that is defined by a road grade, and satisfying the transmission line pressure demand with pressure from the accumulator to begin depleting the accumulator.

According to yet another embodiment of disclosure, a vehicle is provided. The vehicle may include a pump, an accumulator, and a controller. The controller may be configured to responsive to the vehicle traveling at a constant speed for a predetermined time, increase displacement of the pump to hydraulically charge an accumulator, responsive to a pressure of the accumulator exceeding a first threshold that is defined by a first brake specific fuel consumption value, reduce displacement, and satisfy transmission line pressure demand with pressure from the accumulator to deplete the accumulator.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Current automatic transmissions have hydraulically actuated clutches and brakes for controlling the gearing using a hydraulic pump to pressurize and pump fluid to the control elements. Typically, the pump is driven directly by an engine via a mechanical coupling such as an input shaft. The pump may provide hydraulic fluid to various control elements and to an accumulator coupled to or within the automatic transmission. The accumulator may include a piston or diaphragm or bladder that is used to store hydraulic fluid and disperse hydraulic fluid through a series of pressure lines to actuate clutches and brakes to control the gearing within the automatic transmission.

Capturing kinetic energy dissipated when friction brakes are applied are well known. However, these methods often involve complex and expensive components. Kinetic energy may also be present and lost within an automatic transmission. Automatic transmissions may utilize pressurized hydraulic fluid to power the various hydraulic components within the transmission. It is advantageous to capture, store, and release this kinetic energy generated within an automatic transmission. As the vehicle is braking or decelerating, the vehicle generates kinetic energy. This kinetic energy may be captured by utilizing the kinetic energy to operate the pump and to provide pressurized hydraulic fluid to charge the accumulator. During subsequent drive events, the energy stored, in the form of pressurized hydraulic fluid, within the accumulator may be used to hydraulically actuate clutches and brakes within the transmission. Upon discharging the accumulator, the pump may be modulated to meet the hydraulic requirements of the transmission.

Figure 1:
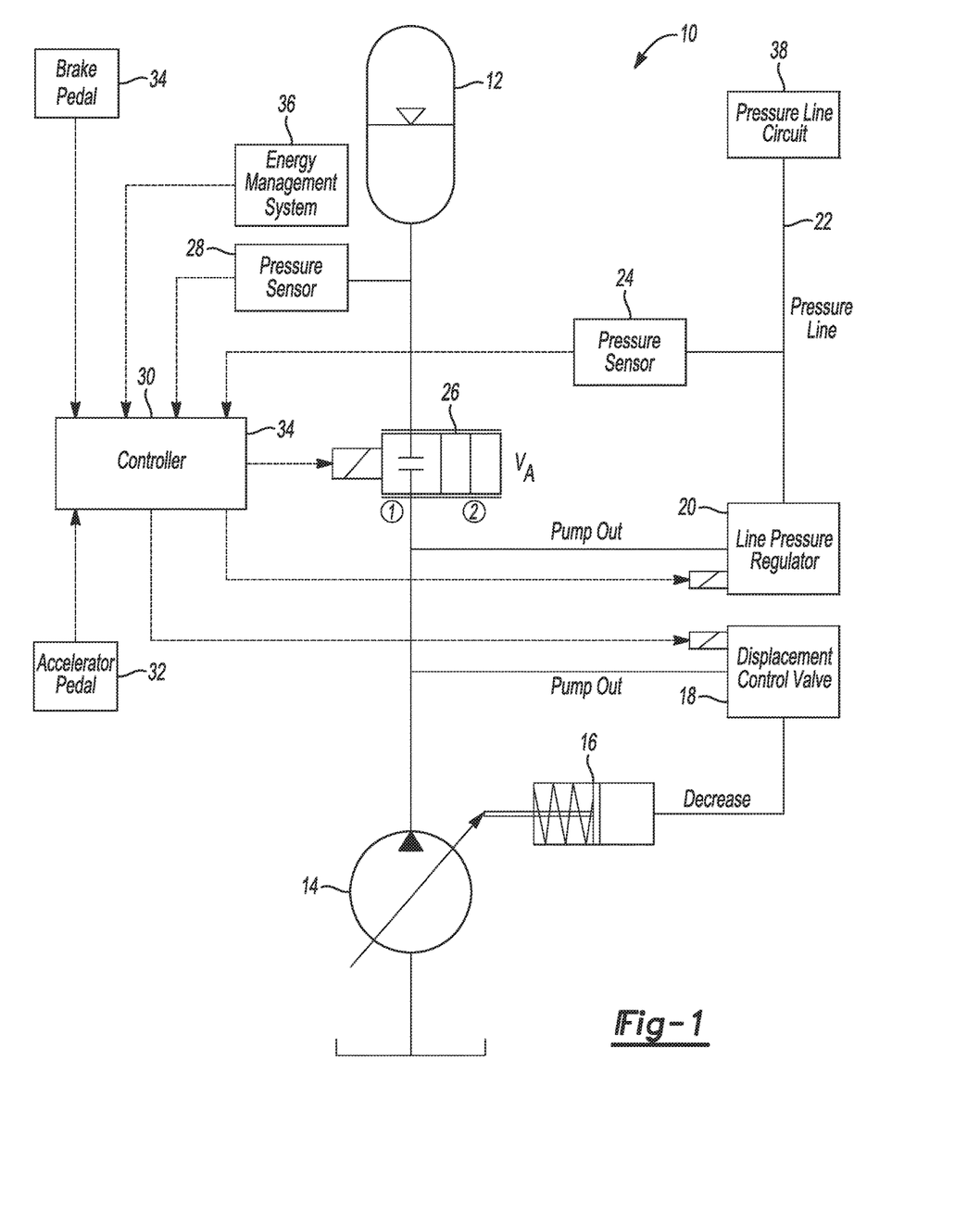
FIG. 1 is a schematic diagram of an example hydraulic circuit according to one embodiment of this disclosure.

Referring to FIG. 1, a schematic diagram of an example hydraulic circuit 10 utilized within an automatic transmission according to one embodiment of this disclosure is illustrated. The circuit 10 includes an accumulator 12 operatively coupled with a variable displacement pump 14. The accumulator 12 may include a piston and spring that may be actuated to store and disperse hydraulic fluid received by the pump 14. The size of the accumulator may range from twenty (20) to two-hundred (200) times the size of the pump. Meaning if the pump is sized of 0.025 liters per revolution, the accumulator may have the size between 0.5 L to 5.0 L. If the accumulator is too small, it would not be capable of capturing a sufficient quantity of kinetic energy generated during a braking event. If the accumulator is too large, the accumulator may be difficult to package within the transmission or vehicle. The pump 14 is mechanically connected, directly or indirectly, to an input shaft coupled to an engine (not shown) and converts mechanical energy to hydraulic energy. The displacement or amount of fluid pumped per revolution of the input shaft may be varied while the pump is running. The displacement of the pump may be altered by the displacement changing mechanism 16. The altered flow may be may be actively controlled based on input from the controller 30 and independent of the line pressure. The displacement changing mechanism may include a spring and a piston or other suitable means to control the displacement of the pump.

A displacement control valve 18 is hydraulically connected to the displacement changing mechanism and pump. The valve 18 may be opened or closed or disposed somewhere between the open and closed position to actively control of the displacement of the fluid. A line pressure regulator 20 is connected between the accumulator, variable displacement pump and a pressure line circuit 38. While the pressure line circuit 38 is represented by a black box, the pressure line circuit may include a plurality of pressure lines each connected to various control elements, e.g., brakes and clutches within the transmission.

The line pressure regulator 20 facilitates control of the pressure within the hydraulic pressure lines. The line pressure regulator 20 may control the line pressure based on a solenoid command from the controller. The line pressure regulator 20 may enable isolation of the accumulator circuit from the line pressure circuit 38 to prevent pressurization of the line pressure circuit. A line pressure sensor 24 is disposed between the pressure line circuit 38 and the line pressure regulator 20. The pressure sensor 24 may determine the pressure within the line and provide a signal to the controller 30 that is indicative of the measured pressure. The controller 30 may provide a signal to the line pressure regulator 20 to command the line pressure regulator to increase, decrease or maintain the pressure within the hydraulic line.

A valve 26 is hydraulically connected between the accumulator 12 and the pump 14. The valve 26 may have two positions of operation, position 1 and position 2. In position 1, the pump flow is disconnected from the accumulator and the fluid flow is sent to the line pressure regulator 20 and the line pressure circuit 38. In position 2, the pump flow is directed to charge the accumulator 12. The valve 26 may also be of proportional type, taking a position anywhere between position 1 and position 2. The valve 26 may receive a signal from the controller 30 to alter the position of operation from position 1 to position 2 and vice-versa. An accumulator pressure sensor 28 may be disposed between the valve 26 and the accumulator 12. The accumulator pressure sensor 28 is configured to provide a signal to the controller 30 that is indicative of the capacity of the accumulator. If the accumulator has no capacity, the pressure of the accumulator 12 is at its highest point. If the accumulator has capacity, the pressure of the accumulator 12 will be less than the highest measured point.

The controller 30 may be a plurality of controllers that communicate via a serial bus (e.g., Controller Area Network (CAN), FlexRay, Ethernet, etc.) or via dedicated electrical conduits. The controller generally includes any number of microprocessors, microcontrollers, ASICs, ICs, volatile (e.g., RAM, DRAM, SRAM, etc.) and non-volatile memory (e.g., FLASH, ROM, EPROM, EEPROM, MRAM, etc.) and software code to co-act with one another to perform a series of operations. The controller may also include predetermined data, or "look up tables" that are based on calculations and test data, and are stored within the memory. The controller may communicate with other vehicle systems and controllers over one or more wired or wireless vehicle connections using common bus protocols (e.g., CAN, LIN, Ethernet, etc.). Used herein, a reference to "a controller" refers to one or more controllers.

The controller 30 may also be configured to dynamically change the operative position of the valve 26 based on the conditions of the vehicle at a future point in time. For example, an energy management system 36 may be electrically coupled with the controller 30 such that the controller may alter the operation of the circuit 10 for various conditions.

Figure 2:
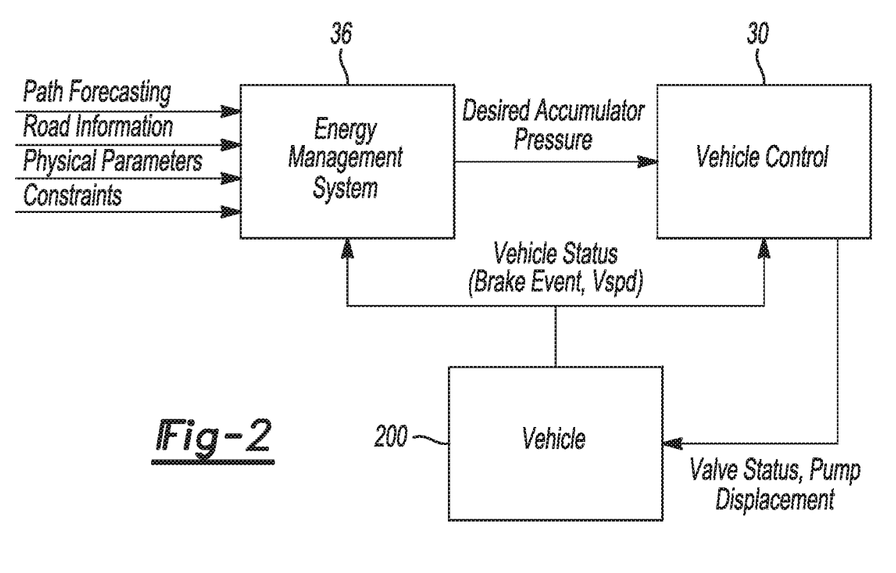
FIG. 2 is a schematic diagram of an example vehicle control circuit according to one embodiment of this disclosure.

Referring specifically to FIG. 2, a schematic of a control circuit including an energy management system 36 operatively connected to the vehicle 200 and controller 36. The energy management system 36 may include a plurality of sensors capable of forecasting a vehicle path, road information, physical parameters and other constraints. The energy management system 36 may communicate signals indicative of a desired accumulator pressure or pump displacement to the controller 30. The controller may provide signals to the vehicle to operate one or more components including but not limited to valve position and pump displacement.

The energy management system may determine a change in elevation along the route and communicate a signal to the controller 30 to command the pump displacement to change or to discharge the accumulator according to the changes in potential braking along the route. The system 36 may also take into account changes in posted speeds that are indicative of locations at which brakes 34 may be applied to reduce the speed, or an accelerator pedal 32 may be used to increase the speed. The system 36 may also determine locations at which a potential stopping point is, such as static locations and dynamic locations. A static location at which a potential stopping point is, includes a traffic light, a stop sign, a round-about, or a yield sign. A dynamic location at which a potential stopping point is along the route includes locations associated with traffic congestion, weather conditions, road construction, or accidents.

The route may be displayed by a navigation system (not shown) connected to the energy management system 36. The route may also be based on map data that has been preloaded in the memory of the navigation system, or the navigation system may receive data streamed from a remote server. The data may be streamed wirelessly using cellular, Wi-Fi or other standard technology. Based on the route, changes in elevation, and potential stopping points along the route the controller 30 may adjust the flow of fluid with in the hydraulic circuit 10. This adjustment reserves hydraulic energy for operating control elements within the transmission.

Figure 3A:
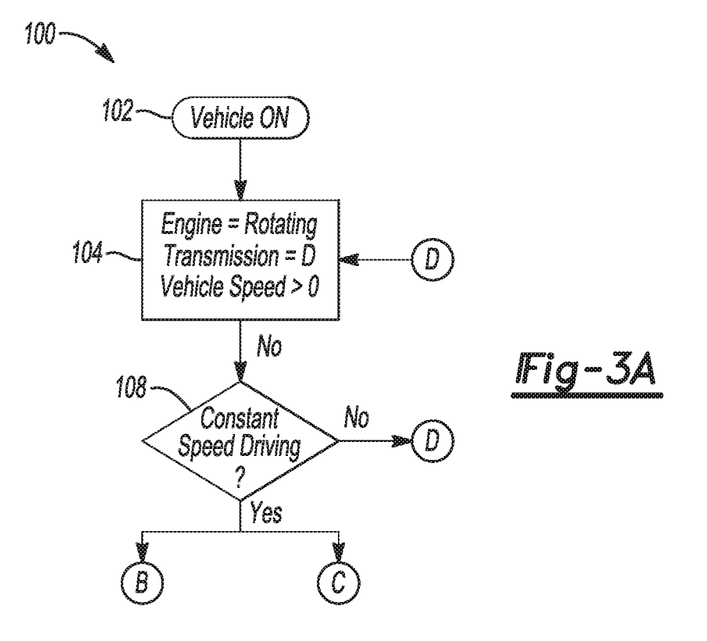
FIG. 3A-3C is a flow chart illustrating a method for operating an automatic transmission according to at least one embodiment.
Figure 3B:
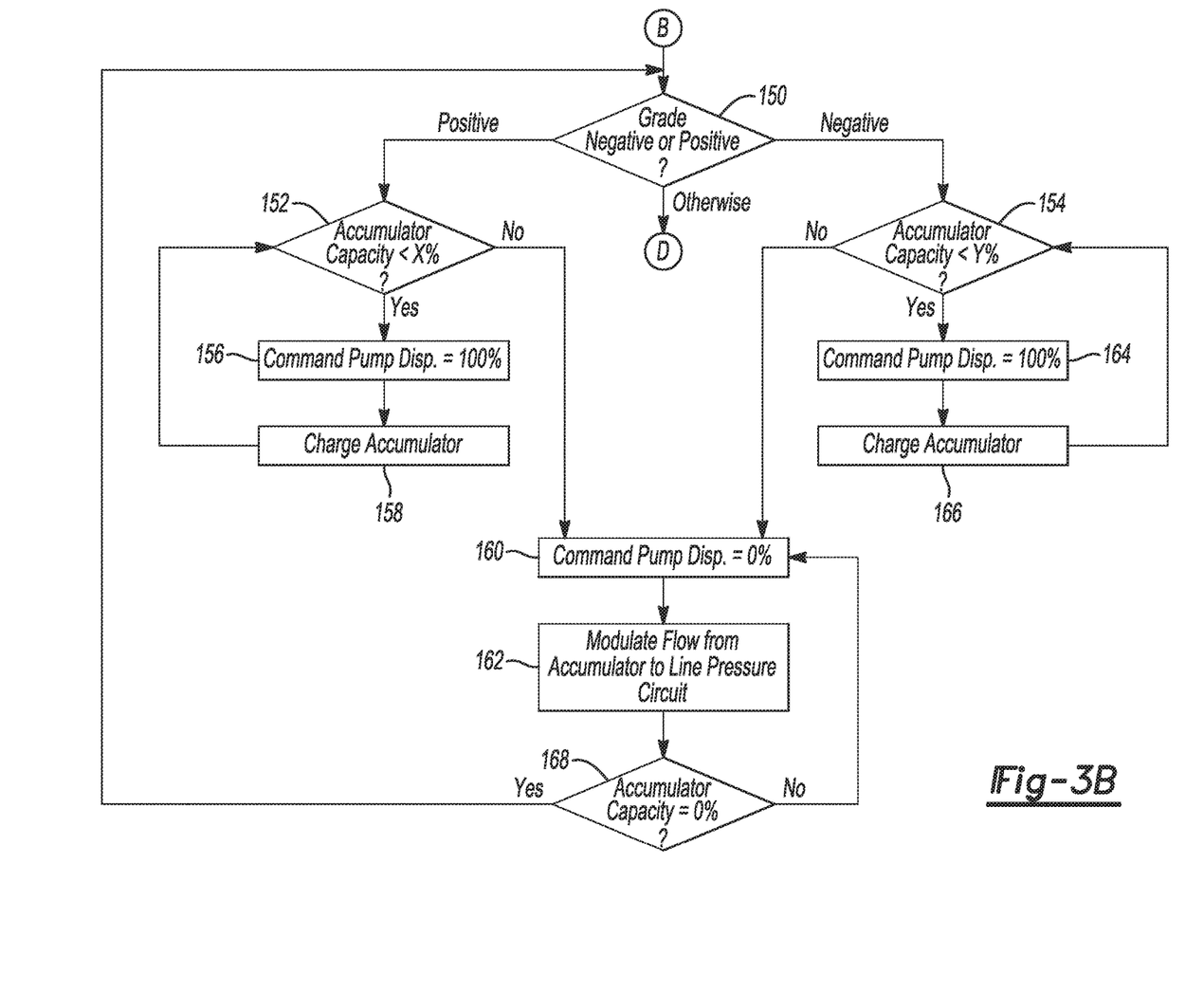
Figure 3C:
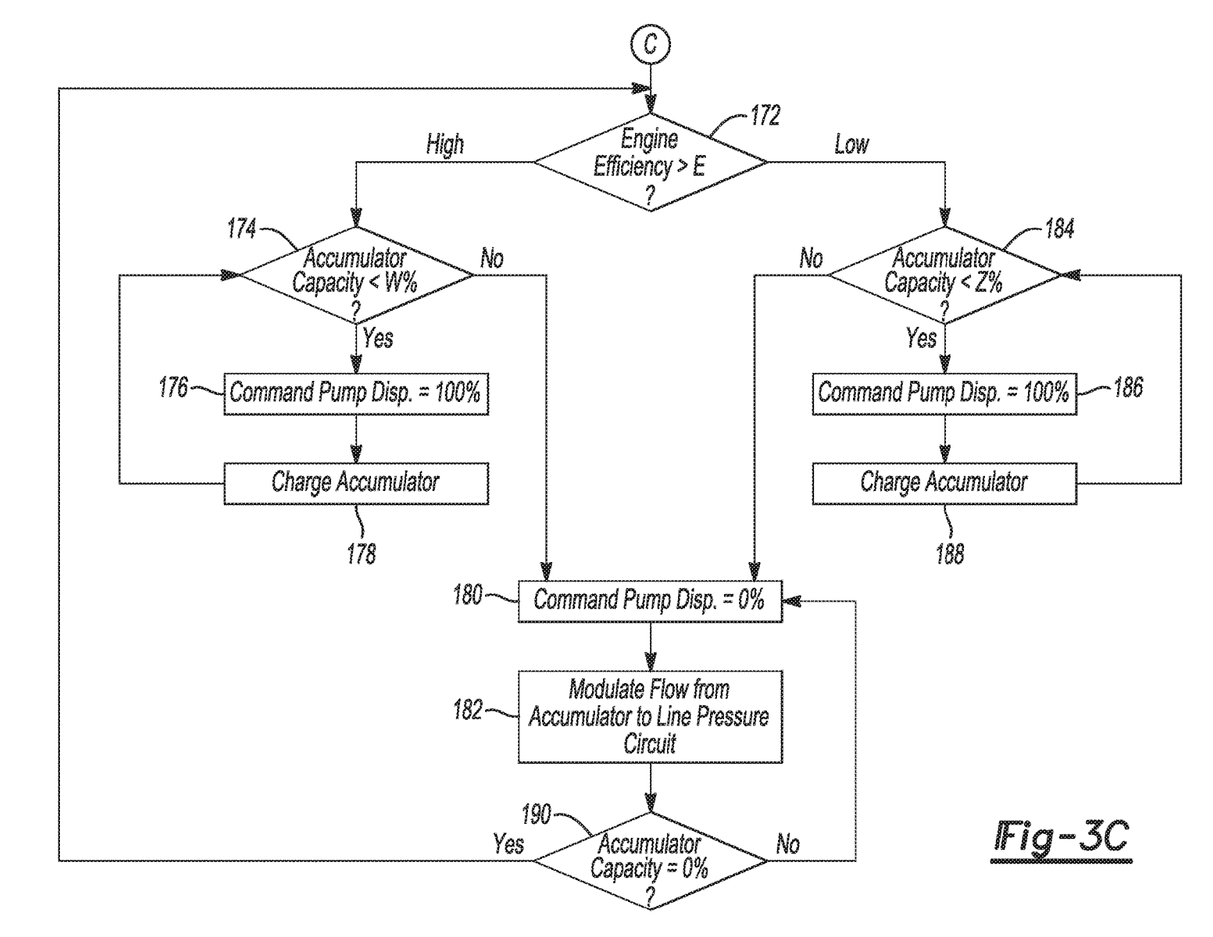

Referring to FIG. 3, a flow chart 100 illustrating a method for operating an automatic transmission according to at least one embodiment shown. In operation 102, the vehicle is powered on by a turnkey ignition or some other suitable ignition. In operation 104, the engine (not shown) is rotating or running and providing rotational movement to the input shaft and pump. The transmission is placed in drive or "D" and vehicle speed is above 0 mph.

In operation 108, the controller 30 branches based on the controller receiving a signal that is indicative of the vehicle driving at a constant speed. The controller 30 may receive various signals from various sensors including but not limited to a vehicle speed sensor, a tachometer, or a wheel speed sensor. The controller 30 may also receive a signal from the energy management system 36. As mentioned above, the energy management system is capable of determining the position of the vehicle, the forecasted path of the vehicle, road information such as an incline or decline or other physical parameters. If the controller does not receive a signal indicative of the vehicle driving at a constant speed, the controller branches to 'D.' If the controller does receive a signal indicative of the vehicle driving at a constant speed, the controller branches to 'B' and 'C.'

In operation 150, the controller branches based on the controller receiving a signal indicative of the vehicle driving on a positive, e.g. incline or a negative, e.g. decline. The controller may receive a signal from an inclinometer (not shown) or the energy management system 36. If the vehicle is driving on an incline or positive road grade, the controller branches to operation 152. If the vehicle is driving on a decline or negative road grade, the controller branches to 154. If the vehicle is traveling on a flat surface, neither a decline nor an incline, the controller moves to 'D.'

In operation 152, the controller branches based on the capacity of the accumulator being below a threshold, X. The capacity may be expressed in terms of a percentage of the available space within the accumulator 12 or the physical volume of fluid within the accumulator 12. The capacity of the accumulator 12 may be determined by measuring the amount of pressure within the accumulator. Therefore, pressure of the accumulator 12 and the capacity of the accumulator 12 may be proportional. As the pressure within the accumulator 12 increases, the capacity of the accumulator decreases. As the pressure within the accumulator 12 decreases, the capacity of the accumulator increases. In other embodiments, the capacity of the accumulator may be determined by some sort of fluid level sensor. If the level of fluid in the accumulator 12 is low, the capacity of the accumulator will be relatively high and vice-versa.

If the capacity of the accumulator 12 is below threshold X, the controller branches to operation 156. In operation 156, the pump is powered on and the commanded pump displacement is increased to at or near 100%. Because the pump displacement is increased to at or near 100%, the valve 26 may be actuated to allow flow from the pump 14 to the accumulator 12 to charge the accumulator 12.

In operation 158, the accumulator is charged until the accumulator capacity is above the threshold X. The threshold X may be correlated to the required amount of fluid required to satisfy the transmission line pressure circuit 38 for a period of time before the pump 14 needs to be used to charge the accumulator 12. In operations 156 and 158, the engine is operating at an increased rate of efficiency as it climbs the positive road grade. It is advantageous to operate the pump at or near 100% displacement so that the accumulator is charged while the engine is operating a higher level of efficiency.

If the capacity of the accumulator 12 is above threshold X, the controller branches to operation 160. In operation 160, the pump displacement is commanded to at 0% or near 0%. As the displacement of the pump decreases so does the amount of energy required to operate the pump. In operation 162, the controller modulates flow from the accumulator 12 to the pressure line circuit 38. The valve 26 may be at least partially opened to modulate flow from the accumulator 12 to the pressure line circuit 38. In operation 168, the controller branches on the capacity of the accumulator being 0%. If the accumulator capacity is 0% the process starts over.

If the vehicle is driving on a decline or negative road grade, the controller branches to operation 154. If the vehicle is driving on a decline or negative road grade, the controller branches to 154. If the vehicle is traveling on a flat surface, neither a decline nor an incline, the controller moves to 'D.'

In operation 154, the controller branches based on the capacity of the accumulator being below a threshold, Y. The capacity may be expressed in terms of a percentage of the available space within the accumulator 12 or the physical volume of fluid within the accumulator 12. The capacity of the accumulator 12 may be determined by measuring the amount of pressure within the accumulator. Therefore, pressure of the accumulator 12 and the capacity of the accumulator 12 may be proportional. As the pressure within the accumulator 12 increases, the capacity of the accumulator decreases. As the pressure within the accumulator 12 decreases, the capacity of the accumulator increases. In other embodiments, the capacity of the accumulator may be determined by some sort of fluid level sensor. If the level of fluid in the accumulator 12 is low, the capacity of the accumulator will be relatively high and vice-versa. In one or more embodiments the threshold Y may be more than X.

If the capacity of the accumulator 12 is below threshold Y, the controller branches to operation 164. In operation 164, the pump is powered on and the commanded pump displacement is increased to at or near 100%. Because the pump is commanded to have a pump displacement is increased to at or near 100% in operation, the valve 26 may actuated to allow flow from the pump 14 to the accumulator 12 to charge the accumulator 12.

In operation 166, the accumulator is charged until the accumulator capacity is above the threshold Y. The threshold Y may be correlated to the required amount of fluid required to satisfy the transmission line pressure circuit 38 for a period of time before the pump 14 needs to be used to charge the accumulator 12. In operations 164 and 166, the engine may be generating kinetic energy as the vehicle descends the decline or negative road grade. It is advantageous to operate the pump at or near 100% displacement while running the pump 14 with the kinetic energy generated by the engine and storing that energy by charging the accumulator 12.

In operation 154, if the capacity of the accumulator 12 is above threshold Y, the controller branches to operation 160. In operation 160, the pump displacement is commanded to 0% or near 0%. As the displacement of the pump decreases so does the amount of energy required to operate the pump. In operation 162, the controller modulates flow from the accumulator 12 to the pressure line circuit 38. The valve 26 may be at least partially opened to modulate flow from the accumulator 12 to the pressure line circuit 38. In operation 168, the controller branches on the capacity of the accumulator being 0%. If the accumulator capacity is 0% the process starts over.

In operation 172, the controller branches based on the controller receiving a signal indicative of a measured engine efficiency. The controller may receive a signal of the engine efficiency from the energy management system 36 or a tachometer. At idle, the engine efficiency is zero, since no usable work is being drawn from the engine. Engine efficiency generally increases as the speed of the engine, measured in revolutions per minute (rpm), increases. If the engine is operating with an efficiency that is greater than threshold E, the controller branches to operation 174. If the engine is operating with an efficiency that is less than threshold E, the controller branches to 184.

In operation 174, the controller branches based on the capacity of the accumulator being below a threshold, W. The capacity may be expressed in terms of a percentage of the available space within the accumulator 12 or the physical volume of fluid within the accumulator 12. The capacity of the accumulator 12 may be determined by measuring the amount of pressure within the accumulator. Therefore, pressure of the accumulator 12 and the capacity of the accumulator 12 may be proportional. As the pressure within the accumulator 12 increases, the capacity of the accumulator decreases. As the pressure within the accumulator 12 decreases, the capacity of the accumulator increases. In other embodiments, the capacity of the accumulator may be determined by some sort of fluid level sensor. If the level of fluid in the accumulator 12 is low, the capacity of the accumulator will be relatively high and vice-versa.

If the capacity of the accumulator 12 is below threshold W, the controller branches to operation 176. In operation 176, the pump is powered on and the commanded pump displacement is increased to at or near 100%. Because the pump displacement is increased to at or near 100%, the valve 26 may be actuated to allow flow from the pump 14 to the accumulator 12 to charge the accumulator 12.

In operation 178, the accumulator is charged until the accumulator capacity is above the threshold W. The threshold W may be correlated to the required amount of fluid required to satisfy the transmission line pressure circuit 38 for a period of time before the pump 14 needs to be used to charge the accumulator 12. In operations 176 and 178, the engine is operating at an increased rate of efficiency. It is advantageous to operate the pump at or near 100% displacement so that the accumulator is charged while the engine is operating a higher level of efficiency so that the pump is operated efficiently.

If the capacity of the accumulator 12 is above threshold W, the controller branches to operation 180. In operation 180, the pump displacement is commanded to 0% or near 0%. As the displacement of the pump decreases so does the amount of energy required to operate the pump. In operation 182, the controller modulates flow from the accumulator 12 to the pressure line circuit 38. The valve 26 may be at least partially opened to modulate flow from the accumulator 12 to the pressure line circuit 38. In operation 190, the controller branches on the capacity of the accumulator being 0%. If the accumulator capacity is 0% the process starts over.

If the engine is operating below an engine efficiency level, the controller branches to operation 184. In operation 184, the controller branches based on the capacity of the accumulator being below a threshold, Z. The capacity may be expressed in terms of a percentage of the available space within the accumulator 12 or the physical volume of fluid within the accumulator 12. The capacity of the accumulator 12 may be determined by measuring the amount of pressure within the accumulator. Therefore, pressure of the accumulator 12 and the capacity of the accumulator 12 may be proportional. As the pressure within the accumulator 12 increases, the capacity of the accumulator decreases. As the pressure within the accumulator 12 decreases, the capacity of the accumulator increases. In other embodiments, the capacity of the accumulator may be determined by some sort of fluid level sensor. If the level of fluid in the accumulator 12 is low, the capacity of the accumulator will be relatively high and vice-versa. In or more embodiments the threshold Z may be less than W.

If the capacity of the accumulator 12 is below threshold Z, the controller branches to operation 186. In operation 186, the pump is powered on and the commanded pump displacement is increased to at or near 100%. Because the pump is commanded to have an increased pump displacement to at or near 100% in operation, the valve 26 may be actuated to allow flow from the pump 14 to the accumulator 12 to charge the accumulator 12.

In operation 188, the accumulator is charged until the accumulator capacity is above the threshold Z. The threshold Z may be correlated to the required amount of fluid required to satisfy the transmission line pressure circuit 38 for a period of time before the pump 14 needs to be used to charge the accumulator 12. In operations 186 and 188, the engine may be operating at a lower level of engine efficiency. Because the accumulator capacity threshold Z may be less than the accumulator capacity W, the required pump displacement to charge the accumulator 12 in operation 184 is less than the required pump displacement in operation 174. Despite the efficiency level being relatively low, it is still advantageous operate the pump at or near 100% displacement while running the pump 14 to charge the accumulator 12.

In operation 184, if the capacity of the accumulator 12 is above threshold Z, the controller branches to operation 160. In operation 160, the pump displacement is commanded to at 0% or near 0%. As the displacement of the pump decreases so does the amount of energy required to operate the pump. In operation 182, the controller modulates flow from the accumulator 12 to the pressure line circuit 38. The valve 26 may be at least partially opened to modulate flow from the accumulator 12 to the pressure line circuit 38. In operation 190, the controller branches on the capacity of the accumulator being 0%. If the accumulator capacity is 0% the process starts over.

A vehicle engine may have an optimal power output corresponding to the current vehicle conditions. One way to assess efficiency of engine power output is by measuring brake specific fuel consumption (BSFC). The BSFC is a measure of the rate of fuel consumption divided by the energy produced by the engine. The values are commonly expressed in units of g/kW-h. Every engine carries different BSFC values. During engine development, a map of engine performance for all steady state operating conditions may be determined. Because the operating points are dependent on engine speed and engine torque, they may vary across the BSFC map. The most advantageous time or instance to charge the accumulator by running the pump may vary according the BSFC operating point of the engine.

Figure 4:
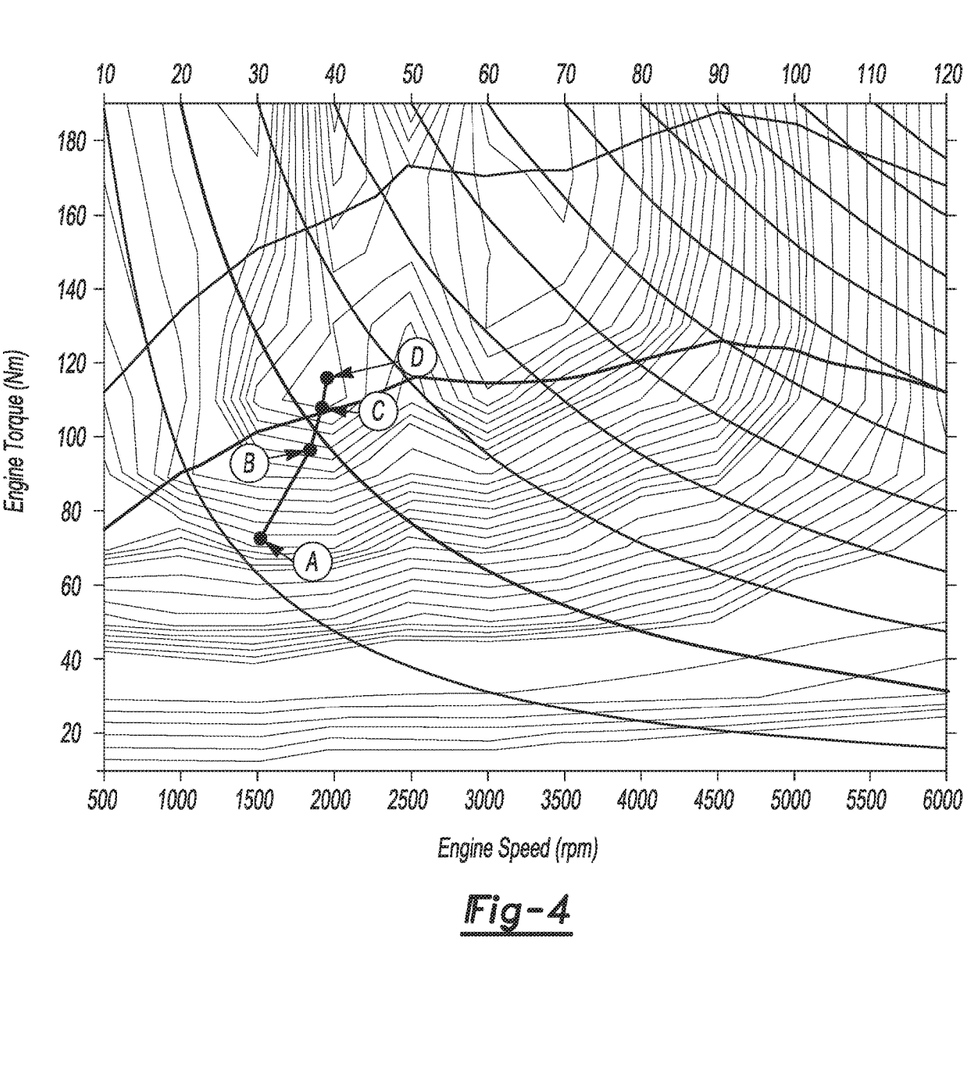
FIG. 4 is an example graph of a brake specific fuel consumption map.

Referring to FIG. 4, an example BSFC map illustrates the optimal BSFC operating point of the engine. The lower horizontal axis represents engine speed in rotations per minute (rpm), and the vertical axis represents engine torque in Nm. The upper horizontal axis represents overall engine output in kW. The engine map represented by the contour lines reflects different engine operating efficiency in g/kW-h. By way of example, curve A-B-C-D on the BSFC map corresponds to engine operating while the vehicle travels at 55 mph across a range of vehicle conditions. Point A corresponds to a BSFC of about 310 g/kW·h. At this point the accumulator capacity or threshold may be lower than an accumulator capacity or threshold associated with points B-C-D. At point A, the vehicle may be descending a hill or traveling on a decline, thus the engine may be producing lower torque and operating at a lower speed. Therefore, increasing the displacement of the pump for an extended period of time to charge the accumulator is comparatively inefficient. Contrarily, engine BSFC is further improved to less than 289 g/kW·h, as seen by the location of point D within the "sweet spot" shown on the BSFC contour map. Because the engine is operating at a more or the most efficient point, it is advantageous to increase the displacement of the pump and charge the accumulator to its maximum capacity.

As mentioned above, the BSFC of a vehicle is correlated to the efficiency of the vehicle or engine. To calculate the actual efficiency of an engine requires the energy density of the fuel being used. Different fuels may have different energy densities defined by the fuel's heating value. For example, regular unleaded gasoline may have a heating value of 18,917 BTU/lb (0.0122222 kW·h/g). The efficiency of the engine is calculated by taking the inverse of the BSFC multiplied by the heating value. Therefore, the gasoline engine's efficiency=1/(BSFC×0.0122222).

Figure 5:
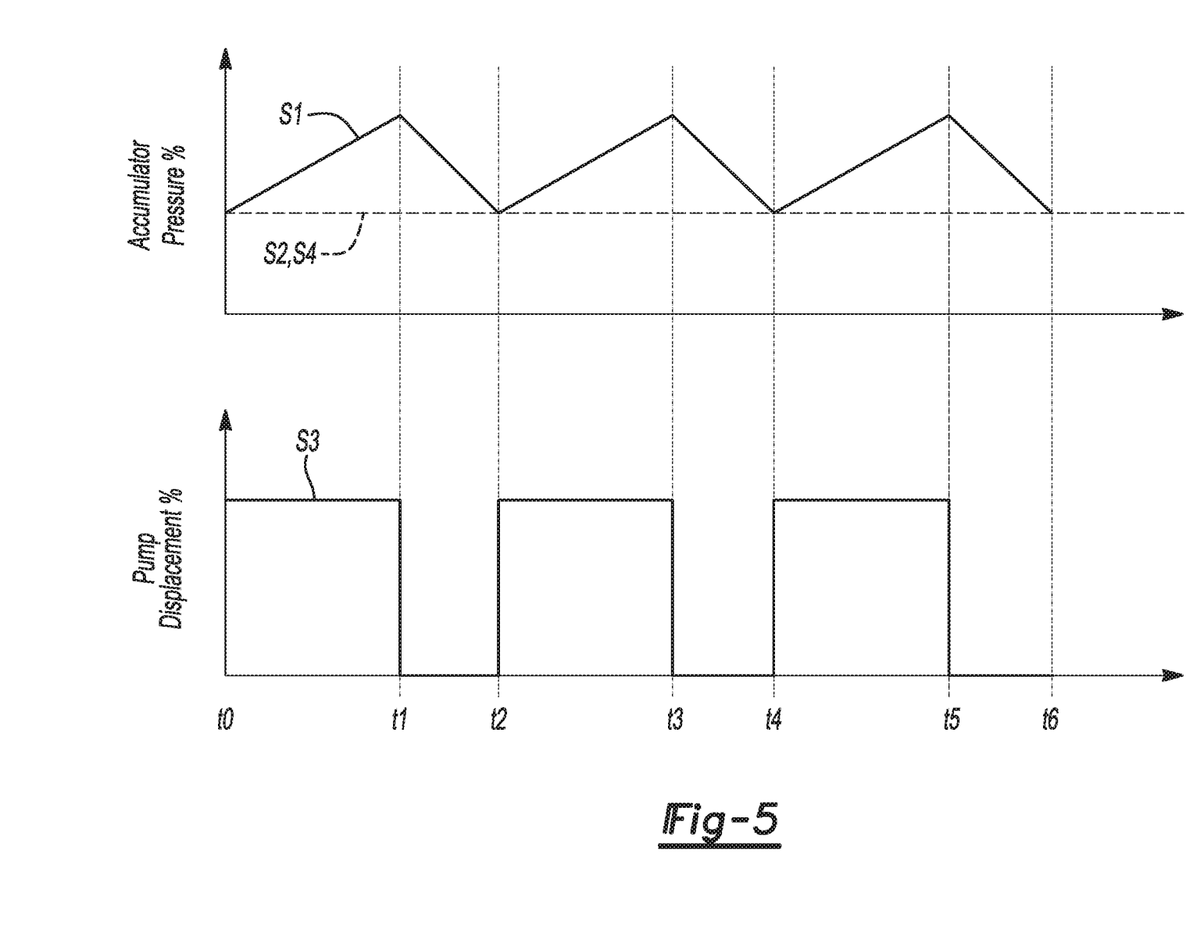
FIG. 5 is a graph showing the operating states of the accumulator and pump.

Referring to FIG. 5, a graph illustrating the status of hydraulic components, and pump displacement and pressure characteristics of the hydraulic components during a driving and braking event. The top graph is representative of the accumulator pressure (psi) and the demanded and actual transmission line pressure over time. Line S1 represents the accumulator pressure, line S2 represents the demanded transmission line pressure of the pressure line circuit 38. Line S4 represents the actual pressure of the pressure line circuit 38. The mean actual pressure of the pressure line circuit 38 closely tracks the demanded transmission line pressure. Line S3 in the bottom graph represents the pump displacement as a percentage.

At t0 the accumulator capacity is below a threshold associated with a road grade and engine efficiency. The displacement of the pump is commanded to or near 100% to charge the accumulator. At t1 the accumulator capacity threshold has been met and the pressurized fluid stored within the accumulator is used to satisfy the transmission line pressure demand. At t2, the accumulator is discharged and the displacement of the pump is commanded to or near 100% to again charge the accumulator.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a controller configured to
responsive to the vehicle traveling at a constant speed for a predetermined time, hydraulically charge an accumulator, and
responsive to a pressure of the accumulator exceeding a first threshold that is defined by a road grade, cease charging the accumulator, and satisfy transmission line pressure demand with pressure from the accumulator to begin depleting the accumulator.

2. The vehicle of claim 1, wherein the controller is further configured to, responsive to the pressure falling below the transmission line pressure demand, satisfy the transmission line pressure demand with pressure from a pump.

3. The vehicle of claim 1, wherein a value of the first threshold is defined by a degree of incline associated with the road grade.

4. The vehicle of claim 3, wherein the value of the first threshold is greater than a value of a second threshold that is defined by a degree of decline associated with the road grade.

5. The vehicle of claim 1, wherein satisfying transmission line pressure demand includes opening a valve to permit flow from the accumulator to a transmission pressure line.

6. The vehicle of claim 1, wherein the controller is further configured to, responsive to the road grade being a decline, increase displacement of an engine driven pump configured to hydraulically charge the accumulator.

7. The vehicle of claim 1, wherein the controller is further configured to, responsive to the road grade being an incline and a speed of an engine exceeding a speed threshold, increase displacement of an engine driven pump to hydraulically charge the accumulator.

8. A method of operating a vehicle comprising:
hydraulically charging an accumulator responsive to the vehicle traveling at a constant speed for a predetermined time;
ceasing charge of the accumulator responsive to a pressure of the accumulator exceeding a first threshold that is defined by a road grade; and
satisfying transmission line pressure demand with pressure from the accumulator to begin depleting the accumulator.

9. The method of claim 8, further comprising satisfying transmission line pressure with pressure from a pump in response to the pressure of the accumulator falling below a second threshold.

10. The method of claim 9, wherein a value of the first threshold is greater than a value of a second threshold.

11. The method of claim 10, wherein the value of the first threshold is defined by a degree of incline associated with the road grade.

12. The method of claim 8, further comprising opening a valve to permit flow from the accumulator to a transmission pressure line in response to the pressure of the accumulator being greater than transmission line pressure.

13. The method of claim 8, further comprising increasing displacement of a pump to hydraulically recharge the accumulator by utilizing energy produced by the vehicle in response to the vehicle ascending a hill and a speed of an engine exceeding a speed threshold.

14. The method of claim 8, further comprising increasing displacement of a pump in response to the vehicle descending a hill, to hydraulically recharge the accumulator by utilizing kinetic energy produced by an engine while the vehicle is descending the hill.

15. A vehicle comprising:
a pump;
an accumulator; and
a controller configured to
responsive to the vehicle traveling at a constant speed for a predetermined time, increase displacement of the pump to hydraulically charge the accumulator, and
responsive to a pressure of the accumulator exceeding a first threshold that is defined by a first brake specific fuel consumption value, reduce displacement, and satisfy transmission line pressure demand with pressure from the accumulator to deplete the accumulator.

16. The vehicle of claim 15, wherein the controller is further configured to responsive to the pressure falling below the transmission line pressure demand, satisfy the transmission line pressure demand with pressure from a pump.

17. The vehicle of claim 16, wherein a value of the first threshold is greater than a value of a second threshold that is defined by a second brake specific fuel consumption value.

18. The vehicle of claim 17, wherein the controller is further configured to, responsive to an engine operating at or below the first brake specific fuel consumption value, increase the displacement of the pump.

19. The vehicle of claim 18, wherein the controller is further configured to, responsive to the engine operating at or above the second brake specific fuel consumption value, decrease the displacement of the pump.

20. The vehicle of claim 15, wherein satisfying the transmission line pressure demand includes opening a valve to permit flow from the accumulator to a transmission pressure line.

* * * * *